April 8, 1924. Re. 15,811

F. T. BAIRD

ADAPTER

Original Filed Jan. 13, 1921

Inventor,
Frank T. Baird,
By
Benjamin, Rockhouse & Lundy.
Attys.

Reissued Apr. 8, 1924.

Re. 15,811

UNITED STATES PATENT OFFICE.

FRANK T. BAIRD, OF BLUE ISLAND, ILLINOIS.

ADAPTER.

Original No. 1,422,331, dated July 11, 1922, Serial No. 436,944, filed January 13, 1921. Application for reissue filed October 10, 1923. Serial No. 667,770.

*To all whom it may concern:*

Be it known that I, FRANK T. BAIRD, a citizen of the United States, residing at Blue Island, in the county of Cook and State of Illinois, have invented a certain new and useful Improvement in Adapters, of which the following is a specification.

My invention relates to electric lanterns of the portable type for use by trainmen and others, wherein the battery is enclosed within a water-tight receptacle and the receptacle is carried within an outer casing supported by a bail or handle and having a base for supporting it. In several prior patents, including No. 1,275,366 and No. 1,278,824 I have shown lanterns in which the battery terminals are at the bottom and there engage terminals in the casing which lead to the electric lamp. The object of my present invention is to improve the electric connection between the battery terminals and the casing terminals and render it certain that good contact will be maintained regardless of any rough usage to which the lantern may be subjected. This object is obtained through the medium of an insulating element, that may be in the form of an adapter or contact plate, and conductors movably mounted thereon and which preferably extend therethrough so as to provide a suitable electrical connection or circuit between the terminals of the battery and lamp. These conductors may be resilient contacts in the manner to be presently described.

The mechanism by which this object is obtained is illustrated in the accompanying drawings in which—

Like numerals denote like parts throughout the several views.

Figure 1:
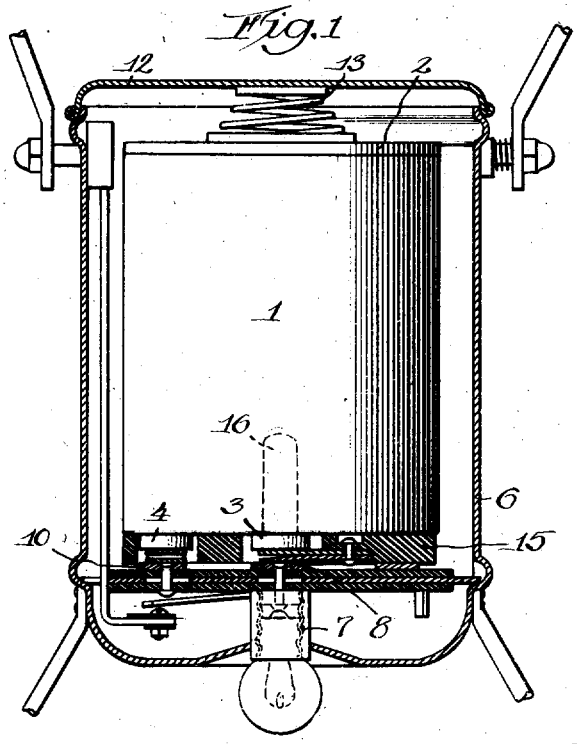
Figure 1 is a general assembly view of the chief parts of the lantern, the casing and adapter plate being shown in central vertical section.

The battery receptacle 1 is cylindrical and formed of vulcanized rubber compound or other suitable material. It is provided with a screw cap 2 and at the bottom has a projecting center terminal 3 and a projecting outer terminal 4. By preference these terminals 3, 4 are cylindrical nuts of good conductive material. The receptacle and its terminals are described in more detail in an application filed on July 13, 1921, Serial No. 436,943. The details of construction of the battery receptacle, however, are not of particular importance in the present case further than just described.

The casing 6 of the lantern is similar in construction to the casings described in my aforesaid earlier patents, and it is sufficient for the present purpose to state that the casing is provided with a lamp socket 7 at the bottom, the terminals whereof are energized through a center contact 8 located at the center of the bottom of the casing and an outer, ring or segmental shaped contact 10 located on the bottom of the casing concentric with the center contact 8. Similar contacts in a lantern casing are shown in the aforesaid patents.

Figure 4:
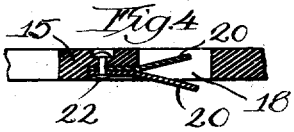
Figure 4 is a sectional detail on the line 4—4, Figure 2.

The lantern casing has a cover 12, on the under side of which is secured a compression spring 13 which, when the cover is closed, presses downward on the battery receptacle for holding it against vibration within the casing, and for pressing the terminals of the battery receptacle down so as to make good electrical contact with the parts which they are to engage. A similar compression spring is shown in my earlier patents, but it has been found in practice that the contact produced between the terminals of the receptacle and the terminals of the lantern casing is not always reliable in the old form where direct engagement was made. These lanterns are frequently subjected to hard use, and it was found that the battery receptacle was sometimes displaced slightly but enough to either break contact or render it inadequate. As a result of my present invention, I have eliminated this source of uncertainty and have provided means for adapting the receptacle to the casing and insuring good electrical contact at all times. This I have accomplished through the agency of an adapter which, in the illustrated design, consists of an insulating element which may be a disk 15 of vulcanized rubber compound or similar substance. This element is of the same diameter as the battery receptacle and may be provided with a plurality of upstanding spring clips 16 for engaging the sides of the receptacle and causing the disk to follow the receptacle when the latter is withdrawn from the casing, or it may be a part of the casing and yieldingly engaged with the battery when the latter is inserted in the casing. This disk or adapter plate has a center hole 18 and an outer hole 19, the former registering with the center contact 8 and the latter coming over the outer contact 10 of the lantern casing. In the present embodiment of my invention shown in the drawings these holes accommodate the terminals 3, 4 and one result is that the plate is prevented from slipping sideways to any great extent and is prevented from rotating. At these holes 18 and 19 are mounted two conductors that are movably disposed therein and preferably extend through the insulating element so as to provide electrical connection between the terminals of the battery and lamp. One manner of constructing these conductors is to provide two leaf spring contacts 20, one having a natural spring or inclination upward and the other downward, as illustrated in detail in Figure 4. These leaf springs are preferably made of bronze or other conductive material and are fastened at the ends by rivets 22 or other appropriate fastening means. At their points of attachment, located at the sides of the holes, they are countersunk into the body of the plate, so that they will not interfere with external objects.

Figure 3:
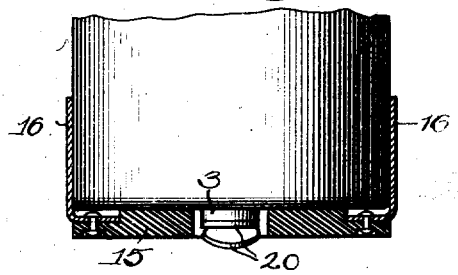
Figure 3 is a vertical section on the line 3—3, Figure 2, and also shows the battery receptacle in position.
Figure 2:
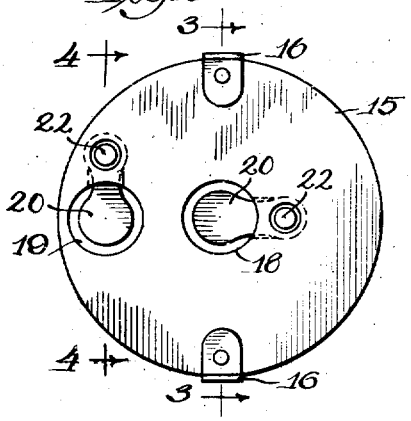
Figure 2 is a top plan view of the adapter plate.

In operation when it is desired to assemble the parts of the structure here illustrated, the plate 15 is first slipped onto the bottom of the battery receptacle 1, as best shown in Figure 3, whereupon the upper contact 20 mounted at the hole 18 will be pressed into engagement with the center terminal 4. This condition is illustrated in Figures 1 and 3. The receptacle with the plate upon it is then lowered into the casing of the lantern, as the result of which the lower spring contacts 20 are pressed into engagement respectively with the center contact 8 of the lantern casing and the outer or ring contact 10 thereof. The weight alone of the battery receptacle and battery is sufficient to hold the movable contacts in good electrical engagement with the fixed contacts 3, 4, 8, 10. When the cover 12 is closed, however, and the spring 13 compressed, the battery receptacle is held firmly in position and the co-operation of the various contacts assured. As the projecting contact 4 descends into the hole 19, the plate cannot rotate and the movable contacts consequently cannot rotate away from said contact 4. While spring 13 holds the battery receptacle against any considerable degree of movement within the casing, there are times when the receptacle may be displaced to a slight extent, but the presence of the movable contacts 20 renders such displacement harmless, for said movable contacts are quite capable of absorbing limited relative movements of the fixed contacts and compensating for such movements and maintaining electrical connection regardless of the position of the battery receptacle, within any reasonable limits. As the result of my invention the lantern may be handled roughly without danger of disturbing the electric connection between the battery terminals and the lamp terminals, and the user will be assured that the lamp will continue burning so long as it is in its socket and the battery is sufficiently charged.

Having thus described my invention, what I claim as new and desire to secure by Letters Patent, is:—

1. In a portable electric lantern, a lantern casing, a battery receptacle adapted to be inserted within it, fixed center contacts on the casing and on the receptacle, fixed outer contacts on the casing and receptacle, an insulating plate adapted to intervene between the casing and the receptacle, said plate having one hole at the center and another at the same distance from the center as the said fixed outer contacts, and double resilient contacts carried by said plate at said holes, one of each pair of resilient contacts pressing upward and the other downward for firmly engaging the respective fixed contacts when the parts are assembled.

2. A portable electric lantern having a casing provided with a fixed center contact and a fixed outer contact at the bottom, a battery receptacle adapted to be contained within the casing, said receptacle having a fixed center contact and a fixed outer contact at the bottom in line with the fixed contacts on the casing, an insulating adapter plate provided with two pairs of spring contacts for engaging the respective contacts on the casing and receptacle, and clips for removably securing the plate to the receptacle.

3. A portable electric lantern having a casing provided with a fixed center contact and a fixed outer contact in the form of a ring at the bottom, a battery receptacle adapted to be contained within the casing, said receptacle having a fixed center contact projecting downward from the bottom and a fixed outer contact also projecting downward at the bottom and confined to a small area, the contacts on the receptacle being directly over the corresponding contacts at the bottom of the casing, an insulating adapter plate interposed between the bottom of the receptacle and the bottom of the casing, said adapter plate having a hole at the center and one distant from the center for accommodating the projecting fixed contacts at the bottom of the receptacle and preventing rotation of the adapter plate, and double spring contacts mounted on said adapter plate at the holes therein for the purpose described.

4. In an electric lantern having a bulb, a bulb-socket, a switch, and a circuit-branch including said bulb-socket and switch, means for establishing a circuit between the terminals of a battery, said bulb and said circuit-branch comprising an insulating element provided with apertures, and conductors movably mounted in the apertures therein and extending through said element for providing movable contact and a circuit between the terminals of the battery, said bulb, and said circuit branch.

5. In an electric lantern having a bulb, a bulb-socket, a switch, and a circuit-branch including said bulb-socket, and switch, means for establishing a circuit between the terminals of a battery, said bulb and said circuit-branch comprising an insulating element provided with apertures, and conductors yieldingly mounted in the apertures therein and extending through said element for providing yielding contact and a circuit between the terminals of the battery, said bulb and said circuit-branch.

6. In an electric lantern having a bulb, a bulb-socket, a switch, and a circuit-branch including said bulb-socket and switch, means for establishing a circuit-branch comprising an insulating element provided with apertures, and conductors movably mounted in said apertures and extending through said element for providing movable contact and a circuit between the terminals of the battery, said bulb, and said circuit-branch.

7. In an electric lantern having a bulb, a bulb-socket, a switch, and a circuit-branch including said bulb-socket and switch, means for establishing a circuit between the terminals of a battery, said bulb and said circuit-branch comprising an insulating element provided with apertures, and conductors yieldingly mounted in said apertures and extending through said element for providing yielding contact and a circuit between the terminals of the battery, said bulb, and said circuit-branch.

In testimony whereof I have hereunto set my hand and seal at Chicago, Cook County, Illinois, this 6th day of September, 1923.

FRANK T. BAIRD. [L. S.]